(12) United States Patent
Collet et al.

(10) Patent No.: US 11,027,509 B2
(45) Date of Patent: Jun. 8, 2021

(54) MOULD FOR A TIRE TREAD COMPRISING CONCEALED CHANNELS

(71) Applicant: COMPAGNIE GENERALE DES ETABLISSEMENTS MICHELIN, Clermont-Ferrand (FR)

(72) Inventors: Etienne Collet, Clermont-Ferrand (FR); Fabien Marlier, Clermont-Ferrand (FR); Ludovic Schmitt, Clermont-Ferrand (FR); Pierre Godin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/645,675

(22) PCT Filed: Aug. 21, 2018

(86) PCT No.: PCT/FR2018/052087
§ 371 (c)(1),
(2) Date: Mar. 9, 2020

(87) PCT Pub. No.: WO2019/053350
PCT Pub. Date: Mar. 21, 2019

(65) Prior Publication Data
US 2020/0276779 A1    Sep. 3, 2020

(30) Foreign Application Priority Data

Sep. 13, 2017 (FR) .................................... 17/58463

(51) Int. Cl.
*B29D 30/06* (2006.01)
*B29D 30/54* (2006.01)
(Continued)

(52) U.S. Cl.
CPC ......... *B29D 30/54* (2013.01); *B29D 30/0606* (2013.01); *B29D 2030/0613* (2013.01);
(Continued)

(58) Field of Classification Search
CPC .... B29D 30/0606; B29D 30/52; B29D 30/54; B29D 2030/0612; B29D 2030/0613;
(Continued)

(56) References Cited

U.S. PATENT DOCUMENTS 2,121,871 A * 6/1938 Havens ................. B60C 11/042
152/209.21
2,843,172 A * 7/1958 Berry .................... B60C 11/045
152/209.21
(Continued)

FOREIGN PATENT DOCUMENTS

EP    0 540 340      5/1993
JP    62-286803    * 12/1987
(Continued)

*Primary Examiner* — James P Mackey
(74) *Attorney, Agent, or Firm* — Cozen O'Connor

(57) ABSTRACT

Mould for moulding a tread of a tire, this tread having a thickness of material to be worn away and a tread surface intended to come into contact with the road surface when the tire is running, this mould having a moulding surface intended to mould the tread surface of the tread, and having a moulding element formed of a blade and a bar, the blade being attached to the moulding surface to mould a sipe in the tread, the bar, borne by the blade to form an enlarged part of maximum width D, being intended to mould a channel in the tread, this channel itself being intended to form a new groove when the tread becomes part worn. Each blade is delimited by two lateral faces forming between them a mean angle of between 6° degrees and 18°. The blade width decreasing from the mould surface when new, as far as the connection with the bar, the blade width meets the bar being (Continued)

at least equal to between 0.2 and 0.4 times the maximum width D.

10 Claims, 2 Drawing Sheets

(51) Int. Cl.
*B60C 11/12* (2006.01)
*B60C 11/03* (2006.01)

(52) U.S. Cl.
CPC ......... *B60C 11/0323* (2013.01); *B60C 11/124* (2013.01); *B60C 11/1281* (2013.01); *B60C 2200/06* (2013.01)

(58) Field of Classification Search
CPC ............. B60C 11/0323; B60C 11/1204; B60C 11/1281; B60C 2200/06; B60C 11/124
See application file for complete search history.

(56) References Cited

U.S. PATENT DOCUMENTS

| | | | | |
|---|---|---|---|---|
| 3,432,888 A | * | 3/1969 | Brierley | B29D 30/0606 425/28.1 |
| 3,546,749 A | * | 12/1970 | Wissel | B29D 30/0606 425/35 |
| 5,503,207 A | * | 4/1996 | Ochiai | B60C 11/0309 152/209.21 |
| 5,772,806 A | * | 6/1998 | Moriya | B29D 30/0606 152/209.25 |
| 9,022,083 B2 | * | 5/2015 | Voss | B60C 11/0306 152/209.18 |
| 9,981,506 B2 | * | 5/2018 | Marlier | B60C 11/0323 |
| 2007/0085447 A1 | * | 4/2007 | Larson, III | H03H 9/132 310/318 |
| 2008/0251175 A1 | | 10/2008 | Ohara | |
| 2009/0159167 A1 | | 6/2009 | Scheuren | |
| 2017/0166015 A1 | * | 6/2017 | Christenbury | B60C 11/1281 |
| 2017/0182851 A1 | * | 6/2017 | Lee | B60C 11/1281 |

FOREIGN PATENT DOCUMENTS

| | | | |
|---|---|---|---|
| JP | 1-153304 | * | 6/1989 |
| WO | WO 2010/030276 | | 3/2010 |
| WO | WO 2011/039194 | | 4/2011 |
| WO | WO 2016/016136 | | 2/2016 |

* cited by examiner

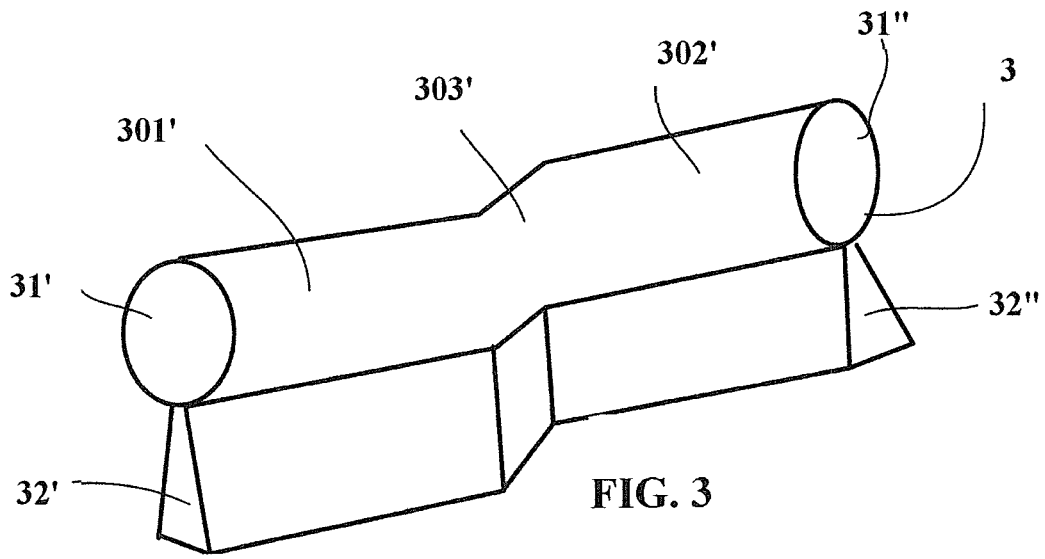
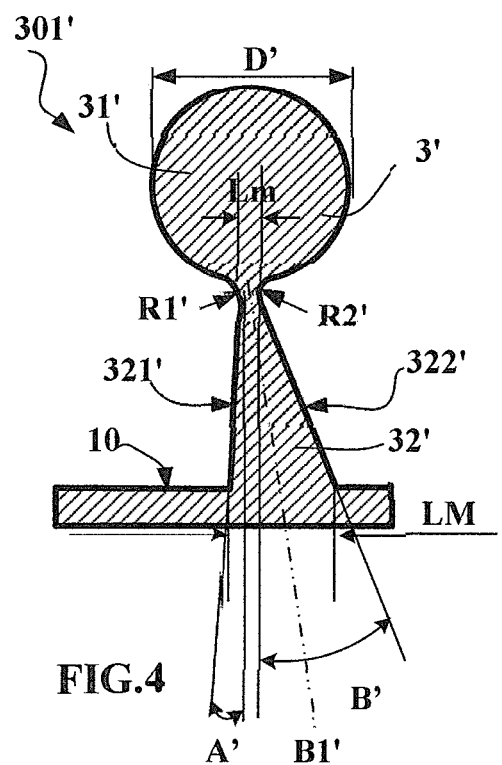
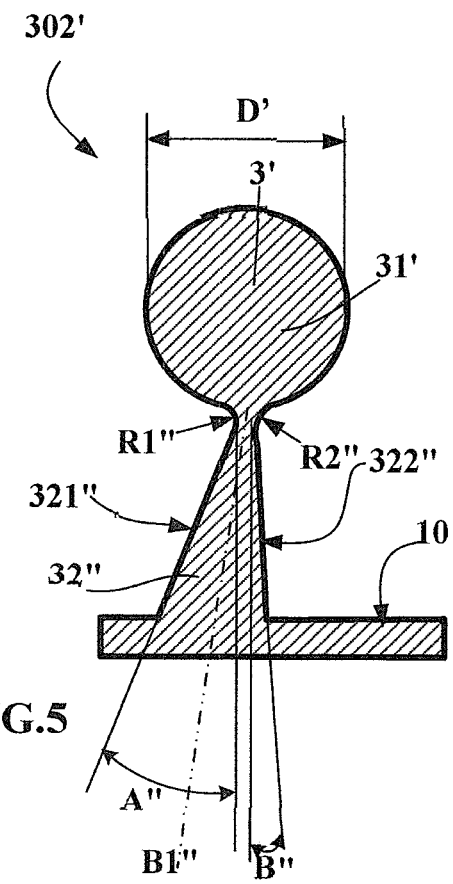

MOULD FOR A TIRE TREAD COMPRISING CONCEALED CHANNELS

RELATED APPLICATIONS

This is a U.S. National Phase Application under 35 USC 371 of International Application PCT/FR2018/052087 filed on Aug. 21, 2018.

This application claims the priority of French application no. 17/58463 filed Sep. 13, 2017, the entire content of which is hereby incorporated by reference.

FIELD OF THE INVENTION

The invention relates to moulds for treads of tires of heavy-duty vehicles and, more particularly, to moulds for moulding the tread patterns that give the tires provided with these treads improved water-drainage performance in wet weather, these treads or tires being more easy to achieve on an industrial scale. This same invention applies in particular to the field of the retreading of heavy-duty tires, and more particularly to obtaining treads intended for the retreading operation.

PRIOR ART

Background of the Invention

As is known, the use of tires on vehicles in wet weather running conditions requires rapid elimination of the water present in the contact patch in which the tire makes contact with the road surface in order to ensure that the material making up the tread comes properly into contact with this road surface in order to generate traction and braking forces while controlling the path of the vehicle.

The term "cut" must be understood to cover grooves, the width of which is suited to preventing the walls that delimit these grooves from coming into contact under the predefined conditions of use, and sipes, the delimiting walls of which are able to come into contact with one another at least partially under the conditions of use.

The circumferentially, transversely or obliquely oriented cuts form a water-flow network which must be a lasting network in order to be fully effective during the entire period of use of a tire between its condition when new and its removal when its wear reaches a limit set by regulations. At that stage, once the surface finish of the tire has undergone preparation, and if the condition of the tire so permits, a retreading operation may be carried out, by attaching a new tread to the tire.

While grooves or, more generally, cavities are essential to draining away water in the contact patch in which the tire is in contact with a road surface, the resulting reduction in the volume of tread material may appreciably affect the wearing performance of this tread and consequently reduce the duration for which the tire can be used, notably as a result of an increase in the rate of wear of said tread. Other tire performance aspects may also be affected, such as the handling performance, road noise performance, or rolling resistance.

Moreover, the grooves reduce the compression and shear stiffnesses because these grooves delimit portions of material which are sensitive to deformation compared with the portions delimited by sipes. Specifically, in the case of a sipe, the faces of material delimiting this sipe can come into contact with one another at least in part when they enter the contact patch. This reduction in stiffness, in the case of the presence of grooves, leads to an increase in deformation and generates a reduction in the wearing performance of the tread: more pronounced wear is observed for a set distance covered (which corresponds to an increase in the wear rate of the tread). Furthermore, an increase in rolling resistance and therefore in fuel consumption of vehicles equipped with such tires is observed as a result of an increase in the hysteresis losses associated with the cycles of deformation of the material of which the tread is made.

Definitions

A radial direction means a direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centred on the axis of rotation. This direction is perpendicular both to the axial direction and to a radial direction.

A tread has a maximum thickness of material to be worn away during running; this maximum thickness corresponds to the depth beyond which it becomes necessary to renew the tire, either by adding a new tread by retreading, or by replacing with a new tire.

A groove is said to be continuous when it opens completely onto the tread surface when new, specifically along its entire length in its main direction.

A groove is said to be discontinuous when it is formed from a succession of parts that are open onto the tread surface when new, these parts being separate from one another in the main direction of this groove (i.e. over its extent).

A groove is said to be hidden, when it is entirely formed inside the tread when new and is intended to form a new groove open onto the tread surface after prior wearing of the tread.

The mean surface of a continuous or discontinuous groove is defined as being a virtual surface that divides this groove, in the main direction of this groove, into two parts which are equal or substantially equal in terms of volume.

The main direction of a groove corresponds to the main direction of a flow of water in the groove when running on a road surface covered with water.

To limit the reduction in stiffness linked to the presence of the grooves, as required by the need to ensure the drainage of the water, it has been proposed in particular in document WO2010/030276 to form a combination of grooves opening onto the surface of the tread when new, and of sipes extended towards the inside of the tread by channels, these channels being intended to form new grooves once the tread becomes part worn.

Document WO 2011/039194 proposes a tire tread having a thickness of material to be worn away, this tread being provided with a plurality of grooves that undulate in the thickness of the tread and that open discontinuously onto the tread surface when new. The geometry of this type of groove is a geometry undulating in the direction of the thickness of the tread between an external level which may be the tread surface when new and an internal level inside the tread. Each undulating groove is discontinuous at the surface but continuous when new within the tread so as to allow fluid to flow. Each undulating groove is formed in the tread by a series of external cavities that open onto the tread surface when new and a plurality of internal cavities, the latter being positioned radially and entirely inside the tread surface in the new state between the external cavities. The internal cavities may be designed to be formed at different depths within the tread. Connecting cavities ensure the continuity of the groove between the internal cavities and the external cavities.

In order to make it easier to mould and demould this type of undulating groove, combining each undulating groove with sipes that continue the internal cavities and the connecting cavities as far as the tread surface when new has been considered.

To mould and vulcanize such treads, use is made of a mould comprising a moulding surface on which relief elements are provided, these being intended to penetrate the unvulcanized material in order to mould the cuts required in the tread.

It has been found that for treads comprising a dense network of cuts formed by channels and/or internal cavities extended to the tread surface by sipes, and more particularly circumferentially oriented channels and sipes, the demoulding forces could become very significant given the great lengths of the circumferentially oriented cuts. Employing these demoulding forces can also generate moulding defects in the tread by material being torn away during the extraction of the relief elements from this tread, these demoulding forces being amplified by the fact that the rubber material is vulcanized and therefore offers greater resistance.

SUMMARY OF THE INVENTION

An object of the invention is to facilitate the demoulding of a tread comprising internal channels or cavities radially below the tread surface of the tread, these internal channels or cavities being extended by sipes towards a surface of this tread. To this end, it is proposed to adapt the dimensional parameters of the relief elements that a tire mould comprises.

This objective has been achieved by modifying the geometry of the faces of a blade extended by a bar having a width greater than the maximum width of the sipe.

The disclosure relates to a mould for moulding a tread of a tire, this tread having a thickness of material to be worn away and a tread surface intended to come into contact with the road surface when the tire is running, this mould comprising a moulding surface intended to mould the tread surface of the tread, this moulding surface comprising at least one moulding element comprising a blade and a bar, the blade being borne by the moulding surface of the mould so as to mould a sipe in the tread, the bar, borne by the blade, forming an enlarged part of maximum width D, this bar being intended to mould a channel in the tread, this channel itself being intended to form a new groove when the tread becomes part worn. This moulding element is such that each blade is delimited by two lateral faces forming between them a mean angle at least equal to 6 degrees and at most to 18 degrees, the blade having a maximum width LM at the surface of the mould or close to the surface of the mould, this width gradually decreasing to be equal to Lm at the connection with the bar, the minimum width Lm of the blade at the connection with the bar being at least equal to 0.2 times and at most equal to 0.4 times the maximum width D of the bar.

As a result of this arrangement, it is possible to more easily initiate a separation between the rubber material and the moulding element during demoulding, and this has the impact of reducing the forces to be produced in order to extract this moulding element from the vulcanized material without there being an effect on the functioning of the sipe in the tire.

A moulding element having the stated characteristics can in particular be produced by implementing the additive manufacturing process described in patent publication WO 2016/016136.

Preferably, the angle between the two lateral faces of the blade is at least equal to 6 degrees and at most to 10 degrees, In a preferred alternative form, the plane that bisects the angle formed by the lateral faces of the blade makes an angle different from zero and at most equal to 6 degrees with a plane perpendicular to the surface of the mould. This makes it possible to make the demoulding forces between each lateral face of the blade non-symmetrical and to further facilitate the demoulding operation.

In another preferred alternative form, it is advisable for the moulding element to be formed of at least a first portion and at least a second portion, these first and these second portions being placed successively alternately. Advantageously, the plane that bisects the angle formed by the lateral faces delimiting the blade in a first portion of moulding element is inclined by a different angle from the bisecting plane formed by the lateral faces delimiting the blade in a second portion of moulding element. This break in continuity is also favourable for demoulding.

Advantageously, in this alternative form, there is formed, between a first portion of moulding element and a second portion of moulding element, a transition portion ensuring the continuity of the element and avoiding an abrupt change.

For preference, cylindrical surfaces, of which the radius of curvature, viewed in a plane of section, is at least equal to 0.6 times and at most equal to 2 times the maximum width D of the bar, are formed where the blade meets the bar.

In addition to the mould claims, a tire tread moulded from such a mould is claimed. This tread may in particular be a tread used for retreading a heavy-duty vehicle tire.

Further features and advantages of the invention will become apparent from the following description provided with reference to the appended drawings which show, by way of non-limiting examples, embodiments of the subject matter of the invention.

BRIEF DESCRIPTION OF THE DRAWINGS

FIGS. 3 and 4 show the same alternative form of a tread mould according to an embodiment of the invention.

In order to make the figures easier to understand, identical reference signs have been used to describe alternative forms of the invention where these reference signs refer to elements of the same kind, whether structurally or functionally.

DETAILED DESCRIPTION OF THE DRAWINGS

Figure 1:
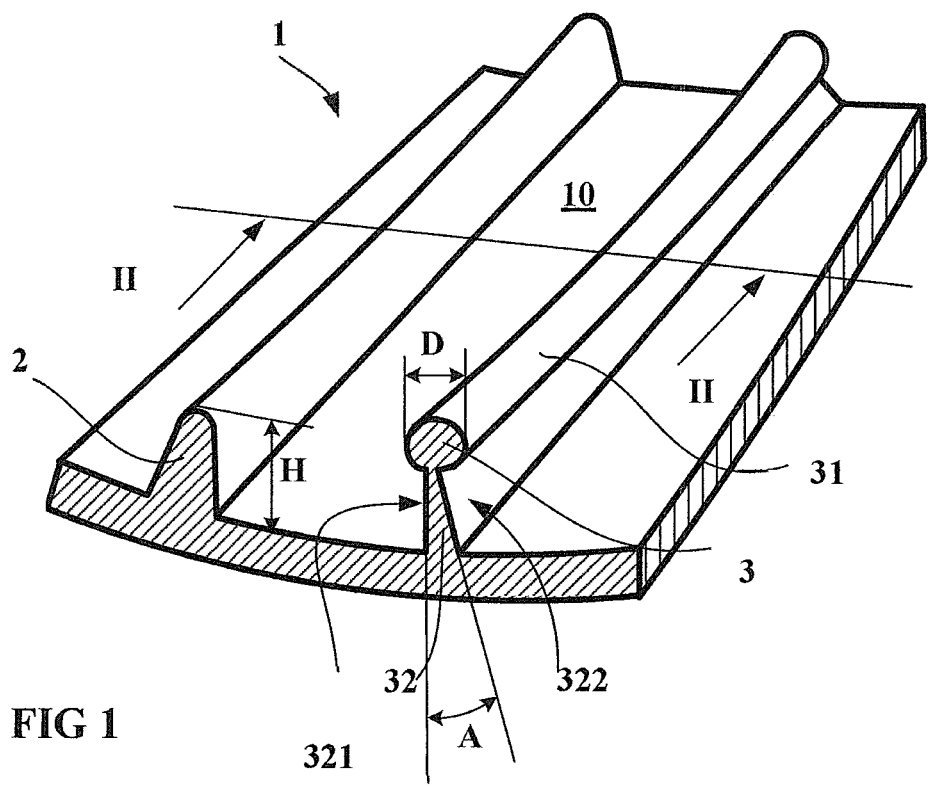
FIG. 1 shows a partial view of a mould according to an embodiment of the invention for moulding a tread for a heavy-duty vehicle tire comprising hidden grooves extended towards the tread surface by sipes.

FIG. 1 shows a part of a mould 1 used for moulding a tread for a tire intended to be fitted to a heavy-duty vehicle.

This mould 1 comprises a moulding surface 10 for moulding a tread surface of the tread, this tread surface being intended to come into contact with a roadway during running.

On this moulding surface 10, there can be seen a rib 2 that is continuous in the circumferential direction, this rib 2 having a total height H corresponding to the depth of the groove which it is intended to mould in a tread (this height H is here equal to 17 mm). The width of this rib 2 gradually decreases, starting from a maximum width LM at the level of the moulding surface 10 and moving away from said surface to reach a minimum thickness Lm. In the present case, these thicknesses are respectively 2 mm and 0.6 mm.

Also depicted is a moulding element 3 for moulding a hidden channel inside a tread, this channel being extended towards the tread surface of the tread when new by a sipe. The height of this relief element, measured with respect to the moulding surface 10, is identical to the height H of the continuous rib 2.

The moulding element 3 comprises a bar 31 or enlarged part of substantially circular section in the present instance, having a maximum width D which is here equal to 6 mm; this enlarged part 31 is extended towards the surface of the mould 10 by a blade 32 of variable width, this width decreasing progressively from the surface of the mould 10 towards the bar 31. This blade 32 has a minimum width Lm equal to 1.9 mm at its connection with the enlarged part 31 and a maximum width LM equal to 3.5 mm at the level of the surface of the mould 10.

The blade 32 is, in the present instance, limited by two lateral flat faces 321, 322 originating on the surface of the mould 10 and forming between them an angle A equal to 13 degrees.

Figure 2:
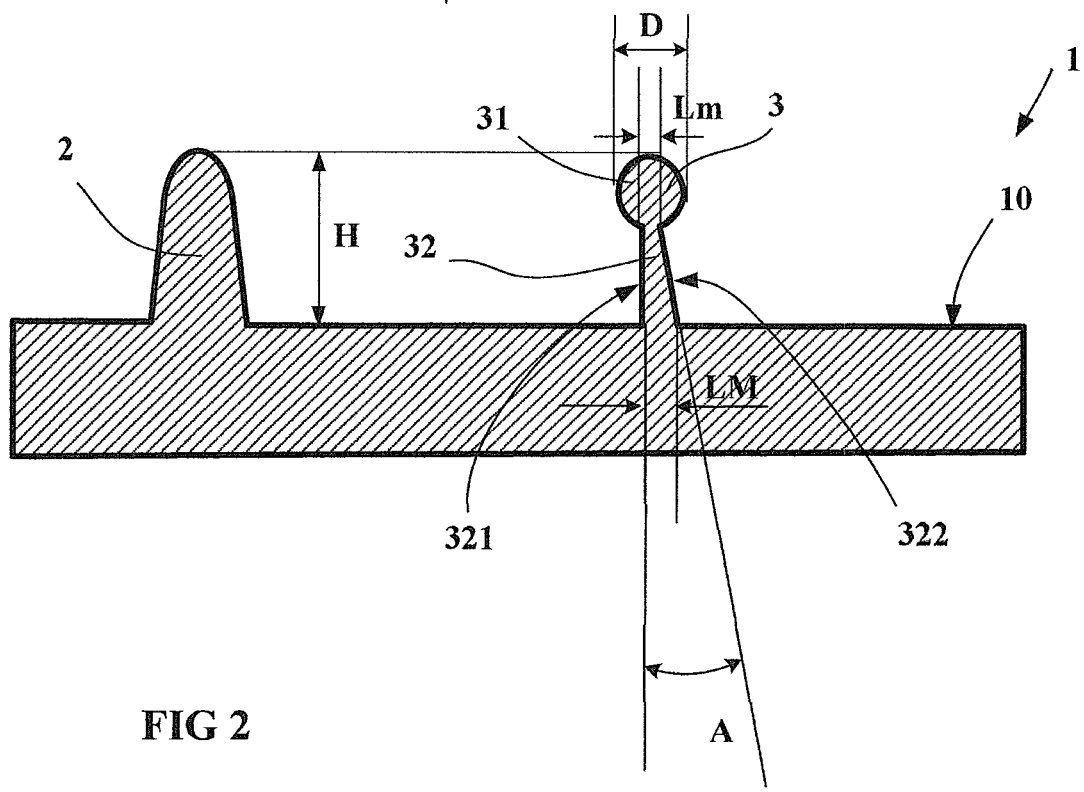
FIG. 2 shows a view in cross section of the mould of FIG. 1.

In the case presented and as can be seen in FIG. 2, which shows the same mould 1 seen in section on a plane identified by the line II-II in FIG. 1, the blade 32 comprises one planar lateral face 321 which is perpendicular to the surface of the mould 10 and another planar lateral face 322 inclined at an angle equal to 84 degrees relative to the moulding surface 10 so as to make an angle A of 13 degrees with the other lateral face 321.

FIGS. 3 to 5 show an alternative form of a tread mould according to embodiments of the invention.

FIG. 3 shows a partial view of a mould 1 comprising on its moulding surface 10, a moulding element 3' comprising a first portion 301' and a second portion 302", the second portion 302" being placed in the extension of the first portion 301' via a transition portion 303'. Each portion of the element comprises a blade of variable thickness fixed on the moulding surface 10 of the mould, this blade carrying an enlarged part forming a continuous bar.

The first portion 301' is depicted in section in FIG. 3; this first portion 301' comprises a bar 31' of maximum width D' (equal in this instance to 6 mm) kept at a distance from the moulding surface 10 of the mould by a blade 32' having a maximum thickness LM (equal to 3.5 mm) at the level of the surface of the mould 10, this blade 32' being delimited by two lateral faces, a first lateral face 321' inclined by an angle A' of 2 degrees relative to a plane perpendicular to the moulding surface 10 and a second lateral face 322' inclined by an angle B' of 6 degrees relative to this same plane. The two lateral faces 321', 322' form an angle of 8 degrees between them. The blade 32' has a minimum thickness Lm (equal to 1.9 mm) where it meets the bar 31'.

The plane that bisects the angle formed between the two lateral faces 321', 322' of the blade 32' is represented by its trace B1' in the plane of FIG. 3; this bisector plane B1' makes an angle of 2 degrees with respect to the plane perpendicular to the surface of the mould 10 and is oriented to the right with respect to this perpendicular plane B1' in this plane of section.

A second portion 302" of the same relief element 3' is shown in section in FIG. 5; this second portion 302" comprises a bar 31" in the continuity of the bar 31' of the first portion 301' which is kept at a distance from the moulding surface 10 of the mould by a blade 32" having a maximum thickness at the level of the moulding surface 10. This blade 32" is delimited by two lateral faces, a first lateral face 321" inclined by an angle A" of 6 degrees relative to a plane perpendicular to the moulding surface 10 and a second lateral face 322" inclined by an angle B" of 2 degrees with respect to this same plane. The two lateral faces form an angle of 8 degrees between them.

Unlike the case with the first portion 301', for the second portion 302" the plane that bisects the angle between the lateral faces 321" and 322" of this second portion, represented by its trace B1" in the plane of FIG. 4, makes an angle of 2 degrees with respect to the perpendicular plane and is oriented to the left with respect to this perpendicular plane in the plane of FIG. 4.

As a result of this alternating arrangement of bisector planes B1' and B1" between the first portion 301' and the second portion 302" of the one same moulding element 3', it is possible to significantly reduce the overall forces to be provided in order to achieve demoulding. The quality of the moulding of the treads is thereby improved.

In addition, between each lateral face of the blades 32' and 32" and the enlarged part 31' of the relief element 3' there is formed a connecting region which, seen in the plane of section of FIGS. 4 and 5, corresponds to a circular arc tangential both to the bar and to the lateral face of the blade with which it connects. The radii R1', R2', R1", R2" of these circular arcs are all equal to 3.6 mm R1' corresponds to the radius of the circular arc tangential to both the bar and the lateral face 321', while R2' corresponds to the radius of the circular arc tangential to both the bar and the lateral face 322'. The radii R1" and R2" are the equivalents of these radii R1' and R2' for the blade 32".

If for aesthetic purposes in particular the part of the sipe opening onto the tread surface is provided with a chamfer on each of its lateral faces, the maximum width LM of the sipe is considered at the last point of the sipe that is lacking this chamfer.

The invention also relates to a tread moulded in a mould as described above and intended to equip a tire for a heavy-duty vehicle.

Of course, the invention is not limited to the examples described and depicted and various modifications can be made thereto without departing from the scope as defined by the claims. In particular, the faces of the blade may be non-planar; in such a case, a mean angle is considered for the angle of each lateral face.

The invention claimed is:

1. A mould for moulding a tread of a tire, the tread having a thickness of material to be worn away and a tread surface adapted to come into contact with the road surface when the tire is running, said mould comprising:

a moulding surface configured to mould the tread surface of the tread, said moulding surface comprising at least one moulding element formed of a blade and a bar, the blade being borne by the moulding surface of the mould so as to mould a sipe in the tread, the bar, borne by the blade forming an enlarged part of maximum width D, being configured to mould a channel in the tread, said channel itself being configured to form a new groove when the tread becomes part worn, this moulding element being such that each blade is delimited by two lateral faces forming between them a mean angle at least equal to 6 degrees and at most to 18 degrees, the blade having a maximum width LM at or proximate the moulding surface of the mould, this width gradually decreasing to be equal to a minimum width Lm at the connection with the bar, the minimum width Lm of the blade at the connection with the bar being at least equal to 0.2 times and at most equal to 0.4 times the maximum width D of the bar, wherein curved arc surfaces, having a radius of curvature at least equal to 0.6 times and at most equal to 2 times the maximum width D of the bar, are formed where the blade meets the bar.

2. A tread having been moulded in a mould according to claim 1, and configured to equip a heavy-duty vehicle tire.

3. A tread having been moulded in a mould according to claim 1 and configured for retreading a heavy-duty vehicle tire.

4. A mould for moulding a tread of a tire, the tread having a thickness of material to be worn away and a tread surface adapted to come into contact with the road surface when the tire is running, said mould comprising:

a moulding surface configured to mould the tread surface of the tread, said moulding surface comprising at least one moulding element formed of a blade and a bar, the blade being borne by the moulding surface of the mould so as to mould a sipe in the tread, the bar, borne by the blade forming an enlarged part of maximum width D, being configured to mould a channel in the tread, said channel itself being configured to form a new groove when the tread becomes part worn, this moulding element being such that each blade is delimited by two lateral faces forming between them a mean angle at least equal to 6 degrees and at most to 18 degrees, the blade having a maximum width LM at or proximate the moulding surface of the mould, this width gradually decreasing to be equal to a minimum width Lm at the connection with the bar, the minimum width Lm of the blade at the connection with the bar being at least equal to 0.2 times and at most equal to 0.4 times the maximum width D of the bar, wherein a plane that bisects the angle formed by the lateral faces of the blade makes an angle different from zero and at most equal to 6 degrees with a plane perpendicular to the moulding surface of the mould.

5. The mould according to claim 4, the moulding element is formed of at least a first portion and a second portion, the plane that bisects the angle formed by the lateral faces delimiting the blade in the first portion being inclined to one side with respect to a plane perpendicular to the moulding surface of the mould, and to another side with respect to that same perpendicular plane in the second portion of the moulding element.

6. The mould according to claim 4, wherein curved arc surfaces, having a radius of curvature at least equal to 0.6 times and at most equal to 2 times the maximum width D of the bar, are formed where the blade meets the bar.

7. The mould according to claim 5, wherein curved arc surfaces, of having a radius of curvature at least equal to 0.6 times and at most equal to 2 times the maximum width D of the bar, are formed where the blade meets the bar.

8. A mould for moulding a tread of a tire, the tread having a thickness of material to be worn away and a tread surface adapted to come into contact with the road surface when the tire is running, said mould comprising:

a moulding surface configured to mould the tread surface of the tread, said moulding surface comprising at least one moulding element formed of a blade and a bar, the blade being borne by the moulding surface of the mould so as to mould a sipe in the tread, the bar, borne by the blade forming an enlarged part of maximum width D, being configured to mould a channel in the tread, said channel itself being configured to form a new groove when the tread becomes part worn, this moulding element being such that each blade is delimited by two lateral faces forming between them a mean angle at least equal to 6 degrees and at most to 18 degrees, the blade having a maximum width LM at or proximate the moulding surface of the mould, this width gradually decreasing to be equal to a minimum width Lm at the connection with the bar, the minimum width Lm of the blade at the connection with the bar being at least equal to 0.2 times and at most equal to 0.4 times the maximum width D of the bar, wherein the moulding element is formed of at least a first portion and a second portion, a plane that bisects the angle formed by the lateral faces delimiting the blade in the first portion being inclined to one side with respect to a plane perpendicular to the moulding surface of the mould, and to another side with respect to that same perpendicular plane in the second portion of the moulding element.

9. The mould according to claim 8, wherein there is formed, between the first portion and the second portion, a transition portion ensuring the continuity of the moulding element.

10. The mould according to claim 9, wherein curved arc surfaces, having a radius of curvature at least equal to 0.6 times and at most equal to 2 times the maximum width D of the bar, are formed where the blade meets the bar.

* * * * *